Patented May 3, 1949

2,469,303

UNITED STATES PATENT OFFICE 2,469,303

INSECT REPELLENT COMPRISING BENZYL ETHERS OF ETHYLENE GLYCOL

Robert B. Killingsworth, Douglaston, N. Y., assignor to Socony-Vacuum Oil Company, Incorporated, a corporation of New York No Drawing. Application March 15, 1945, Serial No. 582,994

1 Claim. (Cl. 167—30)

This invention has to do with products useful as insect repellents, particularly as mosquito repellents, useful against such insects as the mosquito Anopheles quadrimaculatus which is the carrier of malaria and the mosquito Aedes aegypti, carrier of yellow fever and of dengue fever.

The importance of mosquito repellent preparations is evident from the fact that even in densely populated countries with the highest standards of living, insects have not been brought under complete control in spite of tremendous expenditures from public funds. Numerous repellents such as the well known oil of citronella and pyrethrum preparations are in wide demand. In tropical and less civilized countries infested with mosquitoes, human habitation is challenged by the spread of devastating diseases such as malaria and yellow fever transmitted by this insect, in addition to the general disrupture of human activities by the pest or nuisance mosquitoes. In such areas it is frequently necessary to reply on the use of specific drugs and mosquito repellents exclusively. Military operations in the Pacific have created an urgent large demand and the few repellents known have been found inadequate in potency or supply.

This invention is based upon the discovery that alkyl benzyl ethers of ethylene glycol, and particularly the trimethyl benzyl ethers of ethylene glycol possess repellency to a quite high degree.

These compounds are of the general formula

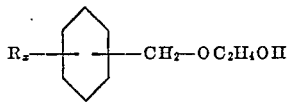

where R represents an alkyl radical of low molecular weight, as methyl, ethyl or propyl and $x$ is 1, 2, or 3. Of particular interest are the trimethyl benzyl ethers of ethylene glycol, that is compounds of the general formula $(CH_3)_3C_6H_2.CH_2.O.C_2H_4OH$ were the methyl groups are positioned 2, 4, 5; 2, 4, 6; and 2, 3, 5.

The efficacy of these materials as repellents is shown by test results against two most prominent carrier mosquitoes; according to the following method of testing, in comparison with citronella, a usual but not too effective repellent, and in comparison with certain somewhat related compounds.

The method of testing consists of applying the straight material in the amount of 1 ml. per forearm of several persons under observation. The forearm is placed at intervals in a cage with mosquitoes and the length of actual exposure time to the first bite is recorded as a measure of the protection afforded. The results of several, at least two tests are averaged. Species of mosquitoes used are Anopheles quadrimaculatus, the transmitter of malaria, and Aedes aegypti, the transmitter of yellow fever and dengue fever. Substances providing 0 to 30 minutes' protection may be classed as having little practical repellent value and those providing 31 to 60 minutes' protection are considered of some value.

Repellency test data

| Material Tested | Test Insect | |
|---|---|---|
| | Anopheles Quadrimaculatus Average Effective Time, Min. | Aedes Aegypti Average Effective Time, Min. |
| Oil of Citronella | Less than 30 | |
| Benzyl Ethyl Ether | Less than 30 | |
| Benzyl Ether of Ethylene Glycol | Less than 60 | |
| Trimethyl Benzyl Ether of Ethylene Glycol | 170 | 290 |

The specific alkyl benzyl ether of ethylene glycol used in the above test was a mixture of the trimethyl benzyl ethers of ethylene glycol.

These repellent materials may be used alone, or in proper carriers. Probably the most useful carrier for most purposes is the ordinary form of deodorized insecticide base, which is a highly treated, white, odorless, nonviscous petroleum fraction boiling in the kerosene boiling range. Other similar carriers may be used, dependent upon circumstances. Also when use is desired in the form of the vaporizing "bombs" now being developed, the material may be carried in "freon" ($CCl_2F_2$) or even with other vaporizing medium, as liquid carbon dioxide. Oil borne forms of the material, may be handled as aqueous dispersions, or the material alone may be handled in an aqueous carrier. All of these forms of application are considered within the scope of the prseent invention, subject only to such limitations as appear in the claim appended hereto.

I claim:

An insect repellent comprising a mono (trimethyl benzyl) ether of ethylene glycol, and a liquid carrier therefor.

ROBERT B. KILLINGSWORTH.

REFERENCES CITED

The following references are of record in the file of this patent:

UNITED STATES PATENTS

| Number | Name | Date |
|---|---|---|
| 2,158,960 | Coleman et al. | May 16, 1939 |
| 2,213,156 | Granett | Aug. 27, 1940 |
| 2,213,215 | Hester | Sept. 3, 1940 |